United States Patent [19]

Morasiewicz

[11] Patent Number: 5,361,535
[45] Date of Patent: Nov. 8, 1994

[54] PLANT PROTECTION DEVICE

[76] Inventor: Kathleen Morasiewicz, 678 Burrows Avenue, Winnipeg, Manitoba, Canada, R2W 2A8

[21] Appl. No.: 22,042

[22] Filed: Feb. 24, 1993

[30] Foreign Application Priority Data

Mar. 4, 1992 [CA] Canada ................... 2062284

[51] Int. Cl.$^5$ ............................................. A01B 79/00
[52] U.S. Cl. ................................. 47/58; 47/2; 52/DIG. 9
[58] Field of Search ....... 47/58.01, 21 A, 2, DIG. 13, 47/30; 52/DIG. 10

[56] References Cited

U.S. PATENT DOCUMENTS

| D. 240,071 | 5/1976 | Lindquist | 52/DIG. 9 |
| 2,876,896 | 3/1959 | Ziehmer | 52/DIG. 9 |
| 4,223,666 | 9/1980 | Wasserman | 47/2 |
| 4,267,665 | 5/1981 | Wallace | 47/2 |
| 4,901,472 | 2/1990 | Donohue | 47/2 |

FOREIGN PATENT DOCUMENTS

| 115252 | 1/1926 | Switzerland | 47/33 |
| 1402424 | 5/1965 | Switzerland | 47/DIG. 9 |

*Primary Examiner*—Henry E. Raduazo
*Attorney, Agent, or Firm*—Adrian D. Battison; Stanley G. Ade; Murray E. Thrift

[57] ABSTRACT

Plants during an initial growth period are protected by a plurality of plastics drinks bottles arranged in a pattern surrounding an area in which the plant is growing. The drinks bottles are engaged by a locating device in the form of a flat sheet with a plurality of openings therein with each bottle being inserted into an opening to engage the locating device to hold the bottles in the pattern surrounding the area. The locating device is a central opening through which the plant can grow and a generally circular outer peripheral edge.

5 Claims, 2 Drawing Sheets

PLANT PROTECTION DEVICE

BACKGROUND OF THE INVENTION

This invention relates to a plant protection device which can be used to surround a plant during the early stages of the growing season to assist in protecting the plant from low temperatures.

It is known to surround a plant with a cylindrical structure defined by an inner and an outer sheet which are connected to form a series of parallel vertical compartments with each compartment being arranged to receive water. The plant is thus physically protected by the surrounding sleeve or cylindrical structure, the structure is held in place by the weight of the water and the water acts as a heat source of high specific gravity which can receive heat from the sunshine during the day and provide heat to the plant and to the surrounding soil should temperatures drop overnight. This maintains the plant at a more uniform temperature for better propogation and can prevent frost damage.

Devices of this type are commercially available but are relatively expensive and relatively flimsy with in some cases a significant danger of leakage after which the device can simply collapse and become valueless.

SUMMARY OF THE INVENTION

It is one object of the present invention, therefore, to provide an improved protection device for plants which operate in a similar manner but which can be provided at less expense and with a more structurally substantial arrangement.

According to the first aspect of the invention, therefore there is provided a method of protecting a plant for growth in an area of soil comprising providing a plurality of plastics drink bottles, locating the bottles substantially side by side in vertical orientation in a pattern surrounding the area, providing a locating device engaging each of the bottles to hold the bottles in the pattern and defining an opening in the area for growth of the plant therethrough, and at least partly filling the bottles with water.

According to a second aspect of the invention there is provided a locating device for use in locating a plurality of plastics drinks bottles in a pattern around a plant for protection of the plant comprising a body having a plurality of outer openings therethrough in closely spaced position around a central opening, each of the outer openings being shaped to receive and locate a plastics drink bottle therein and the central opening being arranged for growth therethrough of the plant.

The device can therefore simply comprise a flat sheet of plastics material which is formed or punched to provide the necessary openings and has sufficient structural strength to grasp and hold the bottles in the required pattern. The thickness and material of plastics material used for supporting cans in the conventional holder can be suitable. Such a material is relatively thin and flexible but is tear resistant to provide sufficient strength that the material can be passed over the drinks bottle while holding one bottle closely adjacent to but slightly spaced from the next adjacent bottle. The openings can be provided by punching the material away to provide a circular opening or can be provided simply by providing a cross slit in the material sufficient to allow the material to be deformed over the bottle. Similarly the central opening can be provided as a cross slit or can be fully cut away to leave a full opening for the plant to grow through.

One or more embodiments of the invention will now be described in conjunction with the accompanying drawings.

BRIEF DESCRIPTION OF THE DRAWINGS

In the drawings like characters of reference indicate corresponding parts in the different figures.

DETAILED DESCRIPTION

Figure 1:
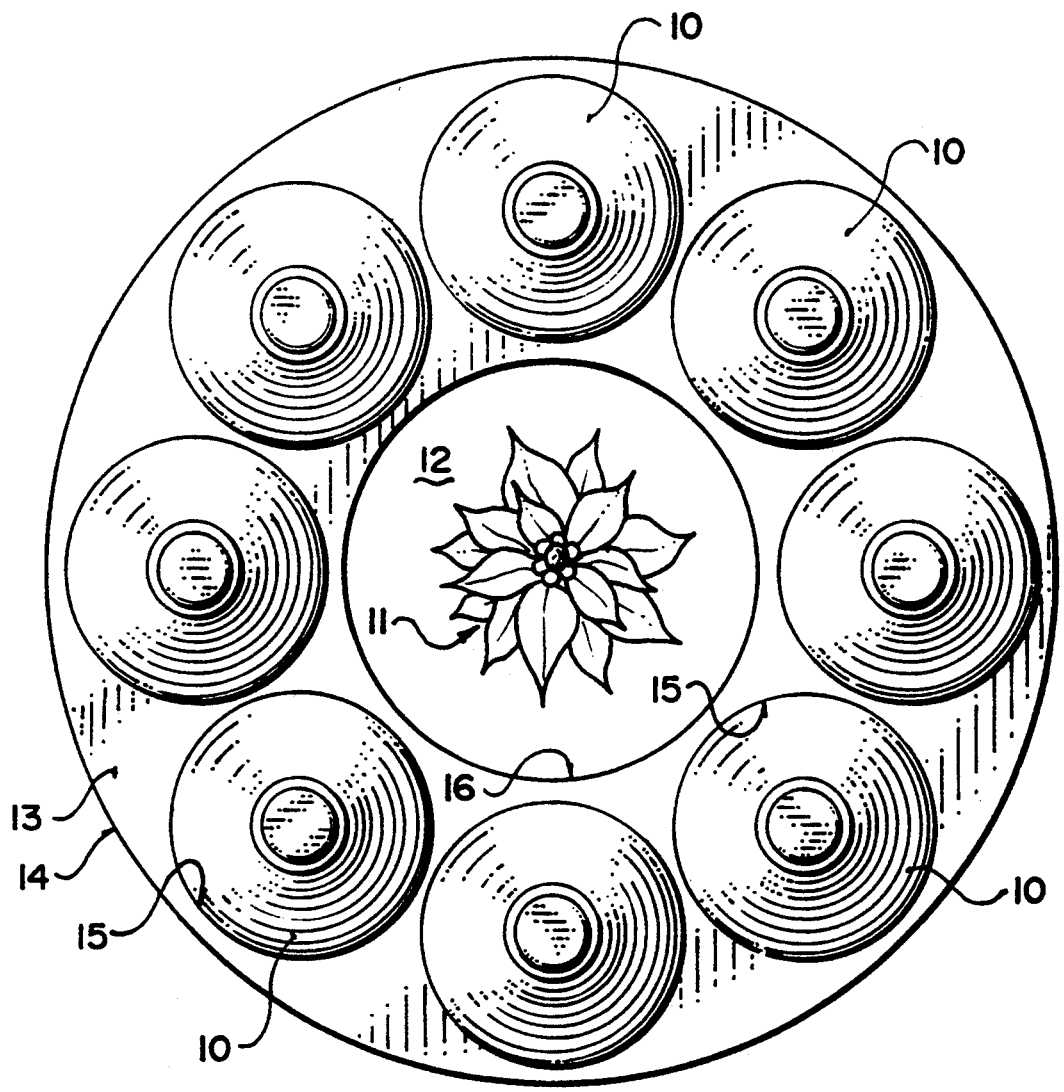
FIG. 1 is a top plan view of the plant protection system including the locating device according to the present invention.

The protection device comprises eight plastics drink bottles generally indicated at 10 each of which can be of the conventional two liter type including a generally cylindrical body which tapers to a neck at the upper end with the neck being closed by a metal cap screwed into place on a screw threaded portion of the neck. Generally bottles of this type include at the lower end a thicker sleeve section which is adhesively attached to the main body of the bottle to provide structural strength and to provide more stability to enable the bottle to stand vertically upwardly when filled with liquid. Bottles of this type are of course well known and are very widely available particularly as garbage after use for transporation of the conventional soft drink.

Recycling of such drink bottles generally does not make use of the bottle itself but simply involves cutting the bottles down to the plastics material for reuse in a subsequent process.

The present invention makes use of the bottles in their complete and fabricated form.

In order to protect a plant generally indicated at 11 in a growing area 12, the bottles are positioned side by side in a pattern surrounding the growing area 12. In the example shown using two liter containers, the bottles are formed into a circle with eight such bottles forming the circle surrounding the area 12. This defines a central area of the order of seven inches in diameter which is sufficient to receive a plant particularly at the early stages of propogation.

The locating device 13 comprises generally a flat sheet of plastics material which has a circular outer peripheral edge 14 and has a plurality of openings 15 formed therein together with a central opening 16 identical to the size of the area for receiving the plant. The openings 15 are formed closely adjacent but slightly spaced both from the edge 14, the opening 16 and from each other.

Figure 2:
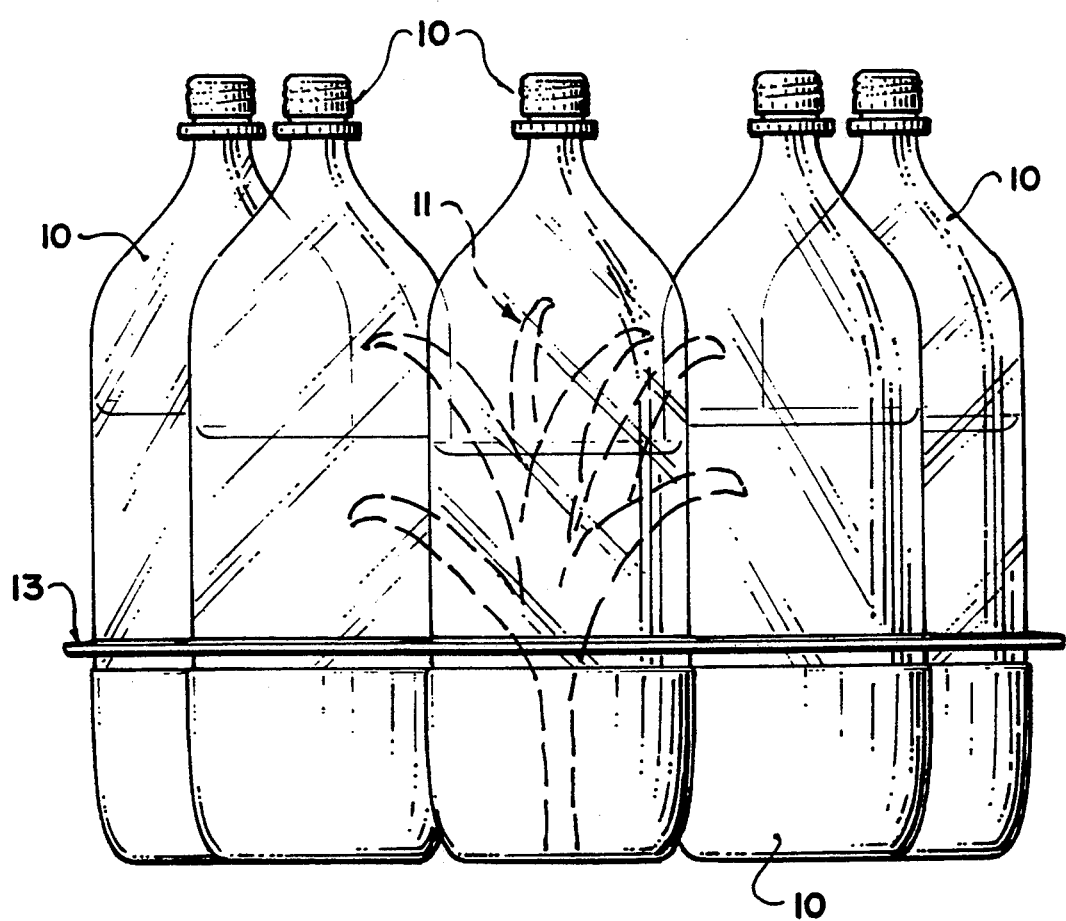
FIG. 2 is a side elevational view of the plant protecting device of FIG. 1.

The plastics material selected can be of the type used for grasping drink cans in that it has a relatively low stretch, very high tear resistance and yet is thin and flexible. Plastic material of this type can be used to be pressed over the bottles either before or after they are located at the required position to a position in which the plastic sheet indicated at 13 in FIG. 2 is positioned partway along the bottles. In the arrangement as shown, the diameter of the outside edge 14 will be of the order of seventeen inches. Each of the openings 15 will have a diameter of four and half inches. As shown the openings are provided by simply cutting the material wholly from the interior of the intended circular opening so that the circular edge of the opening can engage the bottle. In an alternative arrangement (not shown) the material can simply be cut in a manner to allow the bottle to be pushed into the cut and the material stretched to engage around the bottle. Such an arrangement can be used with thinner material and thus can be manufactured at very low cost. Thus for example the cut may be formed as a cross which allows four segments formed by the cross to fold back around the bottle as it is pushed into the opening.

After the bottles are located by the locating device and positioned surrounding the plant in the area 12, the bottles can be filled wholly or partly with water or wtaer containing suitable additives so that the plant is effectively surrounded by a wall of the water which acts as a heat source to prevent cooling or frost damage to the plant.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of protecting a plant for growth in an area of soil comprising providing a plurality of plastics drink bottles, locating the bottles substantially side by side in vertical orientation in a pattern surrounding the area, providing a locating device engaging each of the bottles to hold the bottles in the pattern and defining an opening in the area for growth of the plant therethrough, and at least partly filling the bottles with water.

2. The method according to claim 1 wherein the pattern is circular.

3. The method according to claim 1 wherein the locating device is a circular outer edge.

4. The method according to claim 1 wherein the locating device has a plurality of circular openings each for engaging a respective one of the bottles.

5. The method according to claim 1 wherein the locating devices comprises a substantially flat sheet.

* * * * *